US008280877B2

(12) United States Patent
Zhang et al.

(10) Patent No.: US 8,280,877 B2
(45) Date of Patent: Oct. 2, 2012

(54) DIVERSE TOPIC PHRASE EXTRACTION

(75) Inventors: Benyu Zhang, Beijing (CN); Jilin Chen, Beijing (CN); Zheng Chen, Beijing (CN); HuaJun Zeng, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/859,461

(22) Filed: Sep. 21, 2007

(65) Prior Publication Data

US 2008/0208840 A1  Aug. 28, 2008

Related U.S. Application Data

(60) Provisional application No. 60/891,189, filed on Feb. 22, 2007.

(51) Int. Cl.
*G06F 17/30* (2006.01)

(52) U.S. Cl. .......................... 707/723; 707/739; 707/748

(58) Field of Classification Search ....... 707/2, 999.002, 707/723, 739, 748
See application file for complete search history.

(56) References Cited

U.S. PATENT DOCUMENTS

| | | | | |
|---|---|---|---|---|
| 5,659,732 A * | 8/1997 | Kirsch | ............................... | 707/5 |
| 5,778,363 A * | 7/1998 | Light | .................................... | 1/1 |
| 5,963,205 A * | 10/1999 | Sotomayor | ................... | 715/236 |
| 6,098,034 A * | 8/2000 | Razin et al. | ....................... | 704/9 |
| 6,212,494 B1 * | 4/2001 | Boguraev | .......................... | 704/9 |
| 6,356,864 B1 * | 3/2002 | Foltz et al. | ........................ | 704/1 |
| 6,480,835 B1 * | 11/2002 | Light | ............................. | 707/707 |
| 6,549,897 B1 * | 4/2003 | Katariya et al. | ....................... | 1/1 |
| 6,560,597 B1 * | 5/2003 | Dhillon et al. | ........................ | 1/1 |
| 6,665,681 B1 * | 12/2003 | Vogel | ............................. | 707/101 |
| 6,751,614 B1 * | 6/2004 | Rao | .................................... | 707/5 |
| 6,772,141 B1 * | 8/2004 | Pratt et al. | .......................... | 707/3 |
| 6,778,979 B2 * | 8/2004 | Grefenstette et al. | ............. | 707/3 |
| 6,847,966 B1 * | 1/2005 | Sommer et al. | ................ | 707/739 |
| 7,051,017 B2 * | 5/2006 | Marchisio | ...................... | 707/713 |
| 7,113,910 B1 * | 9/2006 | Pereira et al. | ................. | 704/270 |
| 7,263,530 B2 * | 8/2007 | Hu et al. | ................................ | 1/1 |
| 7,328,216 B2 * | 2/2008 | Hofmann et al. | ............. | 707/100 |
| 7,392,238 B1 * | 6/2008 | Zhou et al. | ............................. | 1/1 |
| 7,483,892 B1 * | 1/2009 | Sommer et al. | ....................... | 1/1 |
| 7,565,630 B1 * | 7/2009 | Kamvar et al. | ....................... | 1/1 |
| 7,606,798 B2 * | 10/2009 | Ge et al. | ................................ | 1/1 |
| 7,630,992 B2 * | 12/2009 | Martin et al. | ......................... | 1/1 |
| 7,769,751 B1 * | 8/2010 | Wu et al. | ........................ | 707/728 |
| 8,095,582 B2 * | 1/2012 | Cramer | ......................... | 707/705 |
| 8,095,583 B1 * | 1/2012 | Everest | ......................... | 708/200 |

(Continued)

OTHER PUBLICATIONS

Chen et al., "Diverse Topic Phrase Extraction through Latent Semantic Analysis", Proceedings of the Sixth International Conference on Data Mining, IEEE, 2006, pp. 1-5, accessed online at <http://ieeexplore.ieee.org/stamp/stamp.jsp?tp=&arnumber=4053112 &tag=1> on May 20, 2010.*

(Continued)

*Primary Examiner* — Phuong Thao Cao

(74) *Attorney, Agent, or Firm* — Lee & Hayes, PLLC

(57) ABSTRACT

Systems and methods for implementing diverse topic phrase extraction are disclosed. According to one implementation, multiple word candidate phrases are extracted from a corpus and weighed. One or more documents are re-weighed to identify less obvious candidate topics using latent semantic analysis (LSA). Phrase diversification is then used to remove redundancy and select informative and distinct topic phrases.

18 Claims, 6 Drawing Sheets

U.S. PATENT DOCUMENTS

| | | | |
|---|---|---|---|
| 2001/0044720 A1* | 11/2001 | Lee et al. | 704/251 |
| 2002/0138528 A1* | 9/2002 | Gong et al. | 707/530 |
| 2003/0037041 A1* | 2/2003 | Hertz | 707/1 |
| 2003/0115187 A1* | 6/2003 | Bode et al. | 707/3 |
| 2004/0225667 A1* | 11/2004 | Hu et al. | 707/100 |
| 2005/0010555 A1* | 1/2005 | Gallivan | 707/2 |
| 2005/0149494 A1* | 7/2005 | Lindh et al. | 707/3 |
| 2005/0154723 A1* | 7/2005 | Liang | 707/3 |
| 2005/0222981 A1* | 10/2005 | Lawrence et al. | 707/3 |
| 2006/0089947 A1* | 4/2006 | Gallivan et al. | 707/102 |
| 2006/0106767 A1* | 5/2006 | Adcock et al. | 707/3 |
| 2006/0106792 A1* | 5/2006 | Patterson | 707/5 |
| 2006/0242190 A1* | 10/2006 | Wnek | 707/102 |
| 2006/0259473 A1* | 11/2006 | Li et al. | 707/3 |
| 2006/0259481 A1* | 11/2006 | Handley | 707/5 |
| 2007/0011151 A1* | 1/2007 | Hagar et al. | 707/4 |
| 2007/0078889 A1* | 4/2007 | Hoskinson | 707/102 |
| 2007/0118498 A1* | 5/2007 | Song et al. | 707/1 |
| 2007/0124299 A1* | 5/2007 | Martin et al. | 707/5 |
| 2007/0174255 A1* | 7/2007 | Sravanapudi et al. | 707/3 |
| 2007/0219986 A1* | 9/2007 | Egozi | 707/5 |
| 2007/0239707 A1* | 10/2007 | Collins et al. | 707/5 |
| 2007/0282826 A1* | 12/2007 | Hoeber et al. | 707/5 |
| 2008/0010276 A1* | 1/2008 | Morton et al. | 707/5 |
| 2008/0010311 A1* | 1/2008 | Kon et al. | 707/102 |
| 2008/0052273 A1* | 2/2008 | Pickens | 707/3 |
| 2008/0109209 A1* | 5/2008 | Fraser et al. | 704/4 |
| 2008/0109399 A1* | 5/2008 | Liao et al. | 707/2 |
| 2008/0127270 A1* | 5/2008 | Shipman et al. | 725/46 |
| 2008/0140606 A1* | 6/2008 | Clark et al. | 707/2 |
| 2009/0024598 A1* | 1/2009 | Xie et al. | 707/4 |
| 2009/0037390 A1* | 2/2009 | Handley | 707/3 |
| 2009/0132901 A1* | 5/2009 | Zhu et al. | 715/206 |
| 2009/0328226 A1* | 12/2009 | Bradford | 726/26 |

OTHER PUBLICATIONS

Chen et al., "Diverse Topic Phrase Extraction from Text Collection", WWW 2006, May 22-26, pp. 1-9, accessed online at <http://citeseerx.ist.psu.edu/viewdoc/summary?doi=10.1.1.95.203> on May 20, 2010.*

Lingpeng et al., "Document Re-Ranking based on Global and Local Terms", Third Sighan Workshop on Chinese Language Processing, 2004, 7 pages, accessed online at <http://www.aclweb.org/anthology-new/W/W04/W04-1103.pdf> on Jun. 27, 2012.*

* cited by examiner

DIVERSE TOPIC PHRASE EXTRACTION

CROSS REFERENCE TO RELATED APPLICATIONS

This application claims the priority to, and the benefit of, U.S. Provisional Application No. 60/891,189 filed Feb. 22, 2007, titled "Diverse Topic Phrase Extraction from Text Collection Using LSA."

BACKGROUND

Traditionally a summary from a corpus, for example, a collection comprising of online documents, is an abstraction of the text constructed from keywords. These keywords are extracted according to a certain importance measure. Previous work in keyword extraction has only considered frequency of occurrence in the corpus, and not the diversity of the keywords. As a result, common keywords are emphasized in the corpus while less obvious but equally pertinent, but less frequent, keywords or phrases are left unrevealed.

For keyword extraction, most traditional methods have used supervised learning methods, which require manually labeled training samples. Only a few studies have been carried out on unsupervised keyword extraction problems for general content documents. For example, words may be ranked by a weighting method referred to as "TF*PDF," where "TF" refers to Term Frequency and "PDF" refers to Proportional Document Frequency. This method gives extra weight to keywords appearing in many documents based on the assumption that words which appear in more documents are more important than others. Another weighting method is Latent Semantic Analysis (LSA), which generates information on the interrelationships between keywords, documents, and concepts. LSA alone suffers from a similar problem as TF*PDF because it also relies only on document and keyword counts. As a result, relevant topics may again be obscured by the infrequency of their keywords in the corpus.

SUMMARY

This summary is provided to introduce concepts for implementing diverse topic phrase extraction from a corpus, or collection of documents. These concepts are further described below in the detailed description. This summary is not intended to identify essential features of the claimed subject matter, nor is it intended for use in determining the scope of the claimed subject matter.

Systems and methods for implementing diverse topic phrase extraction are disclosed. According to one embodiment, multiple word candidate phrases are extracted from a corpus and weighed. One or more documents are re-weighed to identify less obvious candidate topics using latent semantic analysis (LSA). Phrase diversification is then used to remove redundancy and select informative and distinct topic phrases.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for implementing diverse topic phrase extraction are described. For example, the methods and systems described implement phrase topic extraction by selecting word sequences with certain numbers of occurrence and mutual information as candidate topic phrases. The candidate topic phrases are analyzed using latent semantic analysis (LSA) and used to generate topic phrases related to the documents. Such techniques can establish a more informative association between the document and its terms by evaluating a concept or a context, which links the term with the document.

Generally LSA involves a document-term matrix. The document-term matrix is a product of three matrices, which individually relate to the documents, terms, and concepts respectively. The concept provides an association between the document and the term. The concept is attributed by a value, referred to as a singular value, indicative of the relevance of the term with the document under consideration.

To implement diverse topic phrase extraction, an agent within the system performs techniques for candidate phrase generation, document re-weighting and phrase diversification. Each document in a data set may pertain to one or more topics. Moreover, the topic can be correlated to numerous terms, for example, the words "graphics" and "electronics" would be closely related to documents that describe those related technologies.

Document re-weighting involves analyzing the document to determine words occurring within the document which are relevant to the topic of the document. The relevancy of such terms in such cases is not decided on the basis of the frequency of occurrence of words. The respective agent in the system re-weights the documents and its corresponding attributes, the attributes indicating the relevance of the document to the topic. The document re-weighting increases the association of the concept with the document, even though the term, associated with the concept, in consideration may not be frequently occurring in the document.

Phrase diversification involves reducing the redundancy amongst terms that are closely similar to each other in their meaning. For example, agents in the system can implement phrase diversification by maximizing the dissimilarities between the extracted phrases. Terms or keywords that are similar to previously used keywords or terms may result in a change in their relevance. While features and concepts of the described systems and methods for diverse topic phrase extraction from text collection using latent semantic analysis (LSA) can be implemented in any number of different environments, systems, computing-based systems, television-based entertainment systems, and/or other configurations, embodiments of diverse topic phrase extraction from text collection using LSA are described in the context of the following exemplary systems and environments.

Exemplary Architecture

Figure 1:
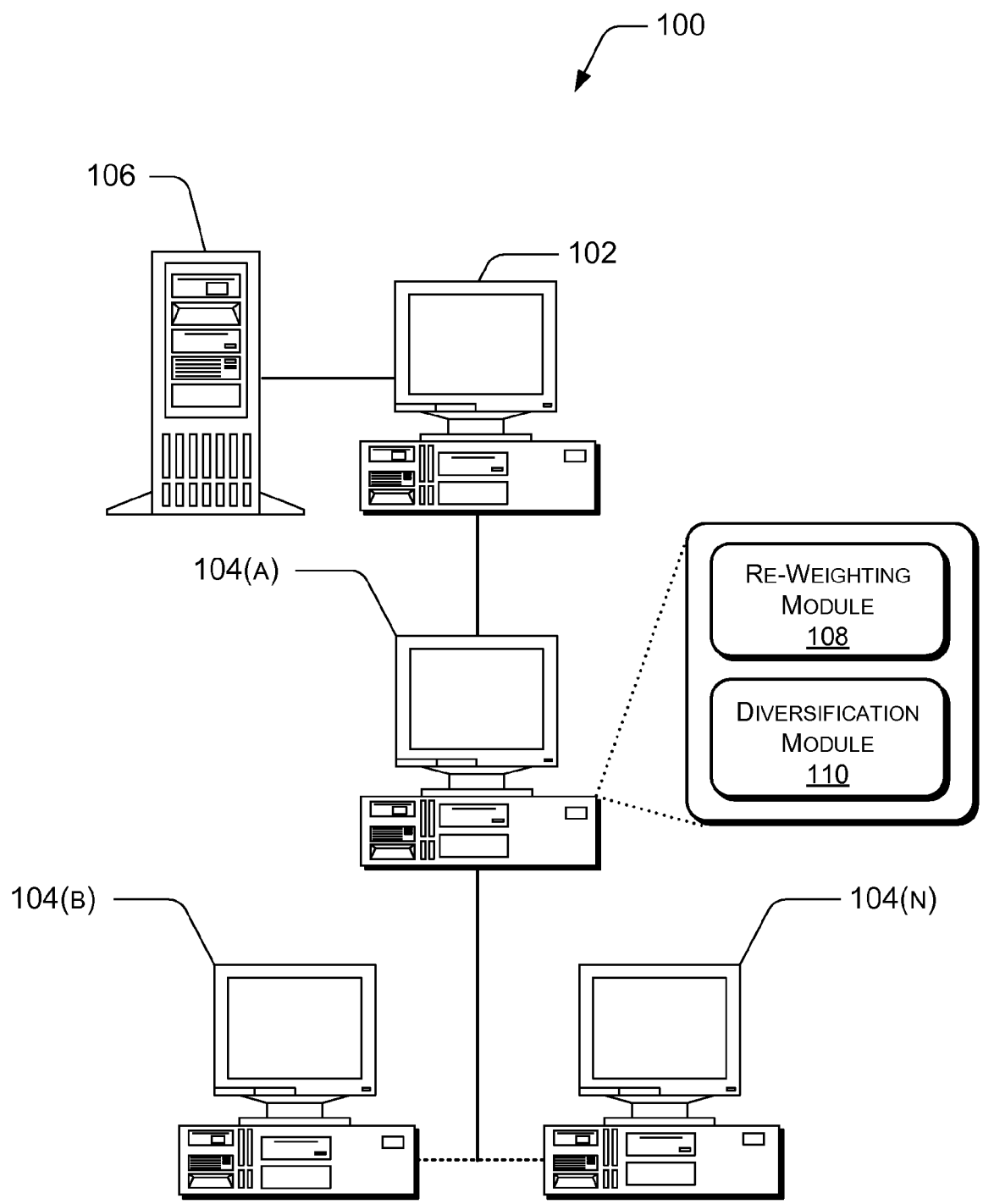
FIG. 1 illustrates an exemplary network architecture for implementing diverse topic phrase extraction.

FIG. 1 illustrates an exemplary computer system 100 implementing diverse topic phrase extraction. Computer system 100 includes a server computing device 102, other computing-based or client devices 104(a)-(n), and a collection server 106. Server computing device 102, client devices 104 (a)-(n), and collection server 106 can include personal computers (PCs), web servers, email servers, home entertainment devices, game consoles, set top boxes, and any other computing-based device known in the art. For the purposes of description only, the client devices 104(a)-(n) would be collectively referred to as client devices 104. Each of the devices may be a collection of independent components. Furthermore, the device can be incorporated or integrated with one another. The computer system 100 can include any number of client devices 104. For example, in one implementation, computer system 100 can be a company network, including thousands of office PCs, various servers, and other computing-based devices spread throughout several countries. Alternately, in another possible implementation, system 100 can include a home network with a limited number of PCs belonging to a single family. The client devices 104 can be coupled to each other in various combinations through a wired and/or wireless network, including a LAN, WAN, or any other networking technology known in the art.

The client devices 104 can also include a phrase extraction and re-weighting module 108, illustrated as re-weighting module 108 and a diversification module 110. The phrase extraction and re-weighting module 108 and/or the diversification module 110 can be functional in one or more of the client devices 104 or the server computing device 102.

The phrase extraction and re-weighting module 108, interchangeably referred to as re-weighting module 108, is capable of managing one or more components performing functions related to implementing diverse topic phrase extraction, and more specifically, to implementing re-weighting of one or more documents. The phrase extraction and re-weighting module 108 re-weights each document to strengthen topics whose related terms have lower frequency of occurrence. For example, to extract k phrases, we select the top k-latent topics with the largest singular values. The selected latent topics are then processed in decreasing order of their singular values, where the singular values represent each latent topic's importance in the dataset.

The diversification module 110 performs the function of phrase diversification, which in turn can reduce the redundancy while extracting phrases from a document collection. The diversification module 110 implements phrase diversification by maximizing the dissimilarity between the extracted topic phrases. Depending on the extent of dissimilarity between the phrases, the diversification module 110 can annotate the phrase in consideration, as being similar to a previous used phrase, and hence redundant. The manner in which the functions of document re-weighting and phrase diversification are performed are explained in further detail in conjunction with FIG. 2.

Exemplary System(s)

Figure 2:
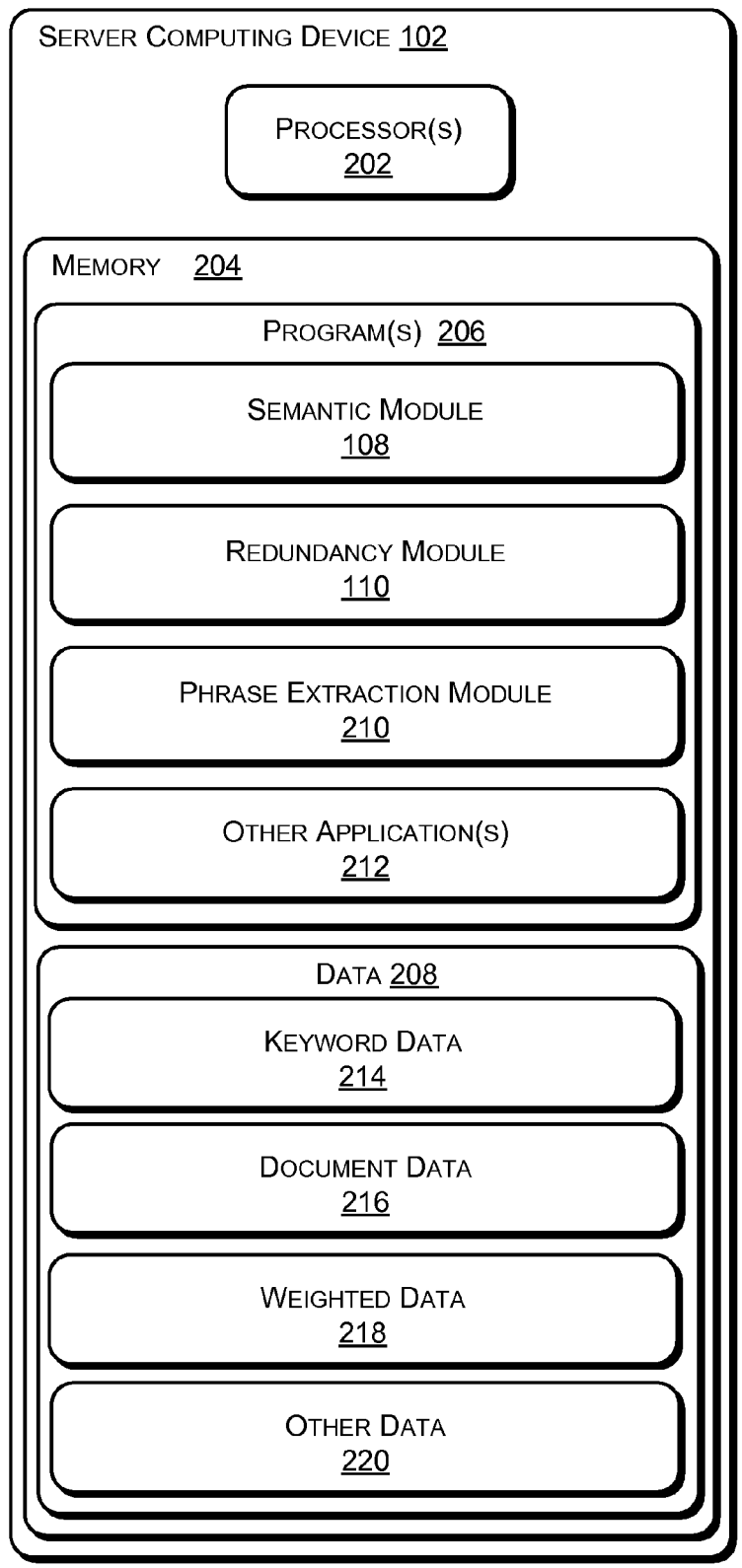
FIG. 2 illustrates an exemplary client device implementing diverse topic phrase extraction.

FIG. 2 illustrates relevant exemplary components of the client devices 104. The client devices 104 can include one or more processor(s) 202 and a memory 204. Processor(s) 202 may include microprocessors, microcomputers, microcontrollers, digital signal processors, central processing units, state machines, logic circuitries, and/or any devices that manipulate signals based on operational instructions. Among other capabilities, processor(s) 202 are configured to fetch and execute computer-readable instructions stored in memory 204.

Memory 204 can include any computer-readable medium known in the art including, for example, volatile memory (e.g., RAM) and/or non-volatile memory (e.g., flash, etc.). As illustrated in FIG. 2, memory 204 also can include program(s) 206 and data 208. Program(s) 206 include, for example, the phrase extraction and re-weighting module 108, the diversification module 110, and other application(s) 210. Other application(s) 210 include programs that supplement applications on any computing based device such as process receiving applications, update applications, and such. Data 208 include, for example, keyword data 212, document data 214, weighted data 216, and other data 218 as is well known in the art.

As indicated previously, the phrase extraction and re-weighting module 108 and the diversification module 110 perform function related to document re-weighting and phrase diversification. The techniques for re-weighting and phrase diversification are applied to phrases or topic phrases. The topic phrases from the documents can be extracted from the documents in consideration by implementing an extraction process, which can interchangeably be referred to as a baseline development procedure. The baseline development procedure can be used for generating a set of candidate phrases, which include one or more constituent words. The constituent words that occur in the documents can be either as part of a phrase or may be occurring at different locations within the document itself. In some cases one or more constituent words arranged one after the other, still may not form a proper phrase. Hence an association between the constituent words can be determined to indicate whether the constituent words so together placed, result in a proper meaningful phrase or not.

In one implementation, the phrases can be identified based on the degree of interdependence between the constituent words. In another implementation, the candidate phrases can be used to evaluate the strength of word association, for example, indicating whether the constituent words convey a meaning or establish a context which is in conformance with a topic associated with the document. In another implementation, the phrase extraction and re-weighting module 108 generates candidate phrases which are a statistical measure of the interdependence between the constituent words. For example, a specified bi-gram word sequence, say sequence xy, a parameter referred to as mutual information can be represented by the following Equation 1:

$$MI(x, y) \approx \log \frac{N_{xy}/N_b}{(N_x/N)(N_y/N)}$$

In the above expression MI indicates the mutual information, $N_{xy}$ is the number of the bi-gram xy; $N_x$ and $N_y$ are the number of occurrences for word x and y; N is number of all words while $N_b$ denotes the number of bi-grams in the corpus. In one implementation, the phrase extraction and re-weighting module 108 evaluates the number of occurrences of one or more contiguous word sequences. If the number of occurrences for such contiguous word sequences exceeds a threshold value, then the phrase extraction and re-weighting module 108 can identify the word sequence as a phrase. In such a manner, the phrases can be extracted from one or more documents wherein the phrases include a more meaningful collection of words in relation to the constituent words. In one implementation, the phrases that are extracted by the phrase extraction and re-weighting module 108 are stored as keyword data 212.

In another possible implementation, the phrase extraction and re-weighting module 108 ranks the phrase terms stored as keyword data 212. For example, the phrase extraction and re-weighting module 108 evaluates an average frequency of occurrence for the constituent words, and ranks the extracted phrases on the basis of the average frequency of occurrence. The phrases with the highest rank can then be selected for further analysis for topic phrase extraction. In an implementation, the phrase extraction and re-weighting module 108 can also associate one or more weights to the phrases depending on the number of the constituent words as longer phrases may be capable of conveying more information as compared to shorter phrases. For example, a phrase of n words $w_1 w_2 w_3 \ldots w_n$ can have an associated weighted average term frequency (referred to as WATF) represented by the following Equation 2:

$$WATF(w_1 w_2 \ldots w_n) = \left(\frac{1}{n}\sum_{m=1}^{n} N_m\right) \cdot \sqrt{n}$$

For Equation 2, as illustrated above $N_m$ is the frequency of $w_m$, the value of m ranging from 1 to n.

As indicated previously, document re-weighting is implemented for imparting greater relevance to terms that have frequency of occurrence that is less than the frequency of occurrence of other terms. For example a word, even though it may not be the most frequent word in the document, may still be relevant to the document topic. Consequently, such words and their phrases can be relevant to the document.

To this end, document re-weighting includes extracting one or more phrases and selecting the top latent topics with largest singular values. The concept of a latent topic and corresponding singular value is based on Latent Semantic Analysis (LSA). Generally, in latent semantic analysis a document and term association can be represented by an LSA matrix which is again acquired by the multiplication of three matrices. The three matrices can each relate to a document, one or more terms that are correlated with the document, and a concept that defines the correlation of the term with the documents. In one implementation, the LSA matrix can be by the following Equation 3:

$$A \approx U \Sigma V^T$$

In the above expression the LSA matrix is represented by the matrix A. Matrices U, V and Σ denote the matrices that are indicative of the document, the term that is correlated with the document, and the concept that defines the association between the documents and the terms. In this manner, the LSA matrix A creates a mapping between the documents and the terms in a fixed dimensional space. The various matrices can also be represented as follows:

$$U = (\alpha_1, \ldots, \alpha_k)$$

$$V = (\beta_1, \ldots, \beta_k)$$

$$\Sigma = \text{diag}\{\epsilon_1, \ldots, \epsilon_k\}$$

Each of the matrices is represented above as a collection of column-wise vectors. As indicated above, the matrix A creates a mapping of the documents and the terms in the fixed dimensional space, say a k-space. A latent topic can thus be considered to be a triple $\{\epsilon_i, \alpha_i, \beta_i\}$ which corresponds to each of the dimension of the k-dimensional space. The latent topic is indicative of a coherent concept in the one or more documents. The value denoted as $\epsilon_i$ can be referred to as a singular value which denotes the importance of the term with respect to the one or more documents.

Returning to the phrase extraction and re-weighting module 108, which is responsible for performing re-weighting of the one or more documents, the phrase extraction and re-weighting module 108 extracts a fixed number of phrases, for example, k phrases. The phrase extraction and re-weighting module 108 selects the top k latent topics or the coherent concept correlated to the document, with the largest singular value as denoted by $\epsilon_i$. The topics that are selected by the phrase extraction and re-weighting module 108 are stored as document data 214. The selected latent topics that are stored in document data 214 are then processed. In one implementation, the latent topics are processed in the decreasing order of their singular value. During processing, a phrase is extracted from the one or more latent topics. The documents are then re-weighted according to the weights that are associated with the current latent topic. In one implementation, the re-weighted value can be evaluated by calculating an LSA-weighted frequency which again defines a new level of importance or relevance of the term and the document. In another implementation, the LSA-weighted frequency can be represented by the following Equation 4:

$$LSAF(w_1 w_2 \ldots w_n) = \sum_{j=1}^{d}\left(|a_{i,j}| \cdot \sqrt{n}\left(\frac{1}{n}\sum_{m=1}^{n} N_{j,m}\right)\right)$$

where $N_{j,m}$ is the term frequency of $w_m$ in a document. The re-weighting accomplishes the strengthening of documents and increase the frequency of terms that appear in the specific document. In addition, a careful analysis of the LSA matrix A would indicate that each of the latent topics is far apart from the other latent topics. This assures that different subset of documents will be strengthened even though the extracted phrase may be occurring only in certain portions of the documents in consideration.

For implementing diverse topic phrase extraction, after re-weighting the documents, phrase diversification is performed. As indicated previously, phrase diversification reduces the redundancy between the extracted phrase topics, for example the topics that are extracted by the phrase extraction and re-weighting module 108. Phrase diversification can be implemented by measuring the dissimilarity between the extracted phrase topics. Depending on the measure of the dissimilarity, the extracted phrases can be classified as dissimilar, i.e. the meanings to which the phrases relate to are dissimilar. This reduces the redundancy amongst the extracted phrases.

To this end, the diversification module 110 can be instrumented to implement phrase diversification. The diversification module 110 measures the dissimilarity score between the extracted phrases. In one implementation, the diversification module 110 maximizes the dissimilarity between the extracted phrases by using a greedy algorithm. The manner in which the dissimilarity can be greedily maximized can be performed by techniques known in the art.

The diversification module 110 measures the dissimilarity by ascertaining similarity of the extracted phrases to topics that have been used as previously selected topic phrases. On determining similarity between the extracted phrases and the previously selected topics, the diversification module 110 reduces the weighted frequency that is associated with the extracted phrases. A reduction in the weighted frequency of the extracted phrase results in the decrease in the contribution or importance of that phrase for that document. In one implementation, the diversification module 110 reduces the value of the LSA-weighted frequency (as evaluated previously), while document re-weighting. In this manner, the weight associated with the extracted phrases is reduced, if it is found that the phrases are similar to previously selected phrases, and hence reducing redundancy.

In another implementation dissimilarity can also be evaluated by comparing coordinates correlative to the dimensional space considered for latent semantic analysis (LSA). For example, consider two phrases P and Q, wherein P is composed of p terms with coordinates $a_1, \ldots, a_p$ occurring sequentially and Q is composed of q terms with coordinates $b_1, \ldots, b_q$ occurring sequentially. In such a case, the dissimilarity score can be represented by the following Equation 5:

$$DIS(P, Q) = \operatorname*{argmin}_{-q \leq \beta \leq p} \sum_{i=1-q}^{p+q} |a_i - b_{i-\beta}|$$

For the above equation, $a_i=0$ for $i<1$ or $i>p$, $b_i=0$ for $i<1$ or $i>q$. In this case, it can be gathered that $a_i$ and $b_j$ are vectors and $|a_i-b_j|$ is their L−1 norm. In this implementation, the value of dissimilarity can be evaluated as sum of distances between corresponding terms in the two sequences with a displacement of β terms. For the above expression, the dissimilarity score so evaluated would consider the ordering of words, i.e. the dissimilarity score so evaluated would also be lower for when one part of say phrase P is similar to another part of phrase Q. The dissimilarity score for the phrases can be stored in document data 214 for further retrieval and analysis.

In yet another implementation, the dissimilarity score is used for evaluating a modified LSA-weighted frequency. The diversification module 110 then ranks the phrases as per the evaluated LSA-weighted frequency for each of the latent topic that was associated with the phrases. The modified LSA-weighted frequency, in one implementation can be represented by the following Equation 6:

$$MLSAF(P) = LSAF(P) \cdot \min_{T \in \{Selected\ Phrases\}} DIS(P, T)$$

For the above expression, the dissimilarity score is the same as that represented by Equation 5. In the above expression, P is a phrase under consideration, {Selected Phrases} is the set of all selected topic phrases from the previously selected latent topics. In another implementation, diversification module 110 reduces the modified LSA-weighted frequency, thereby reducing the redundancy between the selected phrases.

Exemplary Method(s)

Exemplary methods for implementing diverse topic phrase extraction are described with reference to FIGS. 1 and 2. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
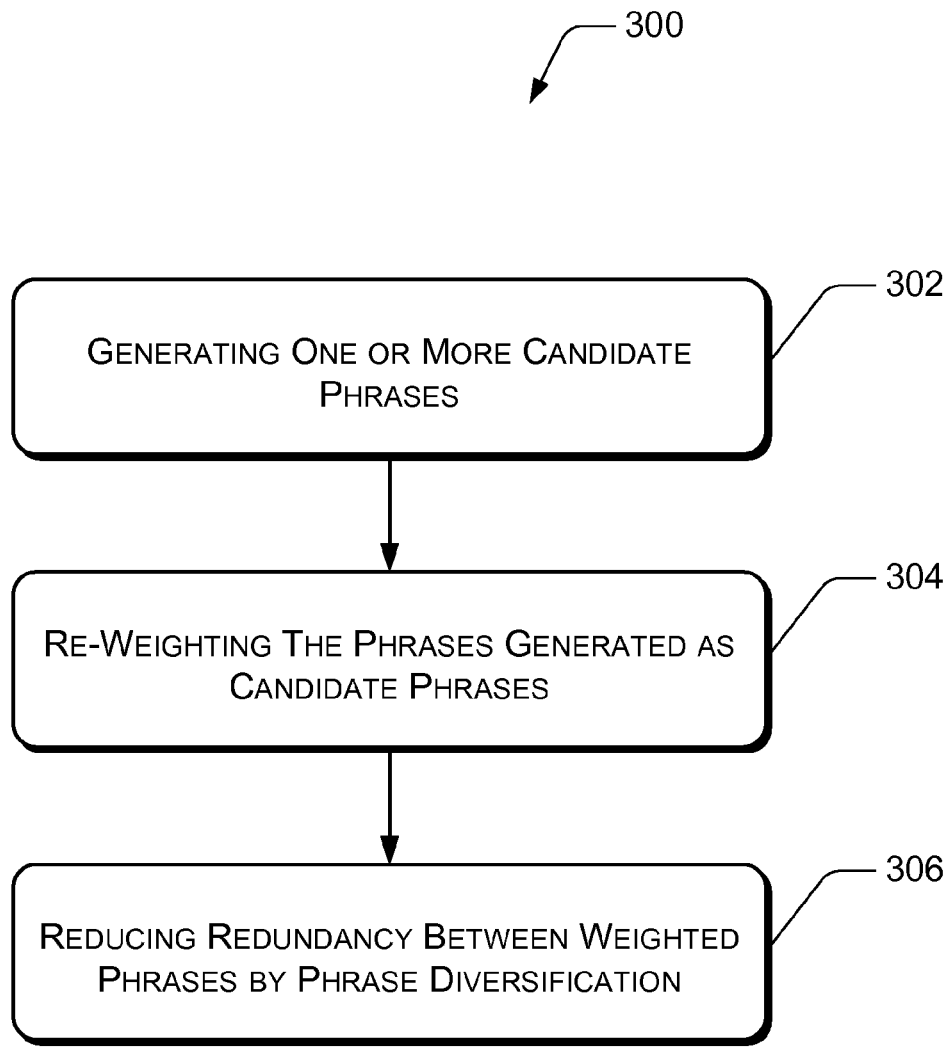
FIG. 3 illustrates exemplary method(s) for implementing diverse topic phrase extraction.

FIG. 3 illustrates an exemplary method 300 being implemented by one or more program modules or agents residing on a computing device, for example, any one or more of the client devices 104.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 302, one or more candidate phrases are generated. For example, phrase extraction and re-weighting module 108 generates one or more candidate phrases. The candidate phrases from the documents can be extracted from the documents through an extraction process, which can interchangeably be referred to as a baseline development procedure.

In an implementation, the phrases can be identified based on the interdependence between the constituent words. The candidate phrases can be used to evaluate the strength of word association, for example, indicating whether the constituent words convey a meaning or establish a context which is in conformance with a topic associated with the document. In another implementation, the phrase extraction and re-weighting module 108 generates candidate phrases which are a statistical measure of the interdependence between the constituent words.

In another possible implementation, the phrase extraction and re-weighting module 108 ranks the phrase terms stored in the keyword data 212. For example, the phrase extraction and re-weighting module 108 evaluates an average frequency of occurrence for the constituent words, and ranks the extracted phrases on the basis of the average frequency of occurrence. The phrases with the highest rank can then be selected for further analysis for topic phrase extraction.

At block 304, the phrases generated in the previous step are re-weighted. For example, the phrase extraction and re-weighting module 108 implements re-weighting of documents. As indicated previously, document re-weighting is implemented for imparting greater relevance to terms that have a frequency of occurrence that is less than the frequency of occurrence of other terms. For example a word, even though it may not be the most frequent word in the document, it may still be relevant to the document topic. Consequently, such words and their phrases can be relevant to the document. The process for re-weighting is further exemplified in conjunction with FIG. 4.

At block 306, the redundancy between the weighted phrases is reduced. For example, the diversification module 110 can be instrumented to implement phrase diversification. Phrase diversification reduces the redundancy between the extracted phrase topics, for example the topics that are extracted by the phrase extraction and re-weighting module 108. The diversification module 110 measures the dissimilarity score between the extracted phrases. In one implementation, the diversification module 110 maximizes the dissimilarity between the extracted phrases by using a greedy algorithm. The process for re-weighting is further exemplified in conjunction with FIG. 5.

Figure 4:
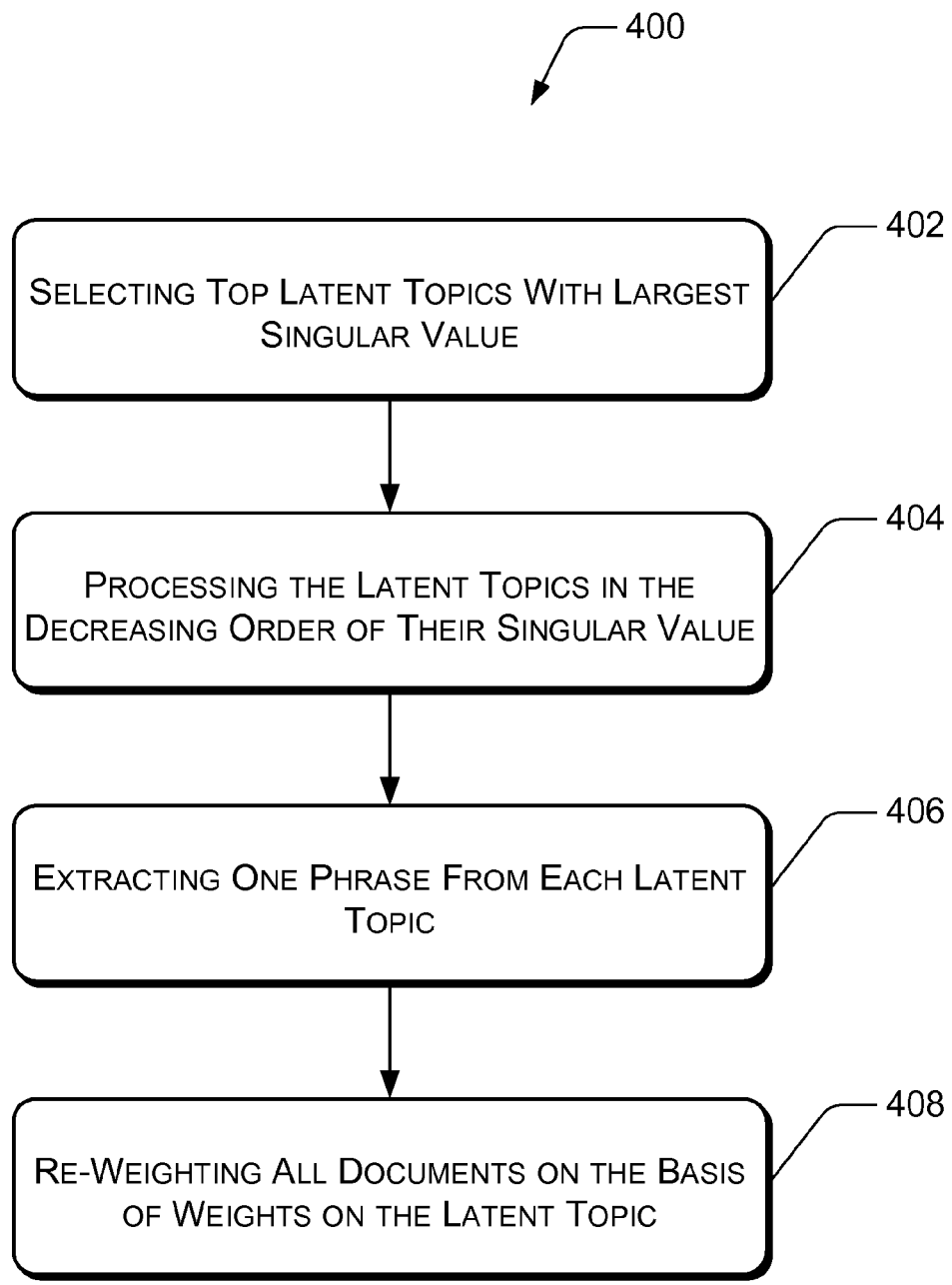
FIG. 4 illustrates exemplary method(s) for implementing document re-weighting.

FIG. 4 illustrates an exemplary method 400 being implemented by one or more program modules or agents residing on a computing device for re-weighting of documents, for example, in any one or more of the client devices 104.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, the top latent topics are selected based on their singular value. For example, the phrase extraction and re-weighting module 108 extracts a fixed number of phrases, say k phrases. The phrase extraction and re-weighting module 108 selects the top k latent topics with the largest singular value. The singular value denotes the importance of the term with respect to the one or more documents. The topics that are selected by the phrase extraction and re-weighting module 108 are stored as document data 214.

At block 404, the latent topics are processed in the decreasing order of their singular value. For example, the phrase extraction and re-weighting module 108 processes the selected latent topics that are stored in document data 214. The processing of the latent topics is implemented in the decreasing order of their singular value. In one implementation, the result of the processing performed by the phrase extraction and re-weighting module 108 I stored in weighted data 216.

At block 406, one phrase is extracted from each of the latent topics. For example, the phrase extraction and re-weighting module 108 extracts one phrase from each of the latent topics. In one implementation, the phrase extraction and re-weighting module 108 extracts the phrases from the latent topic on the basis of the singular value.

At block 408, all the documents are re-weighted on the basis of the weights that are associated with the latent topics. For example, the phrase extraction and re-weighting module 108 evaluates the re-weighted value by calculating an LSA-weighted frequency which again defines a new level of importance or relevance of the term and the document. The re-weighting accomplishes the strengthening of documents and increase the frequency of terms that appear in the specific document. In one implementation, the weighted documents are stored in weighted data 216.

Figure 5:
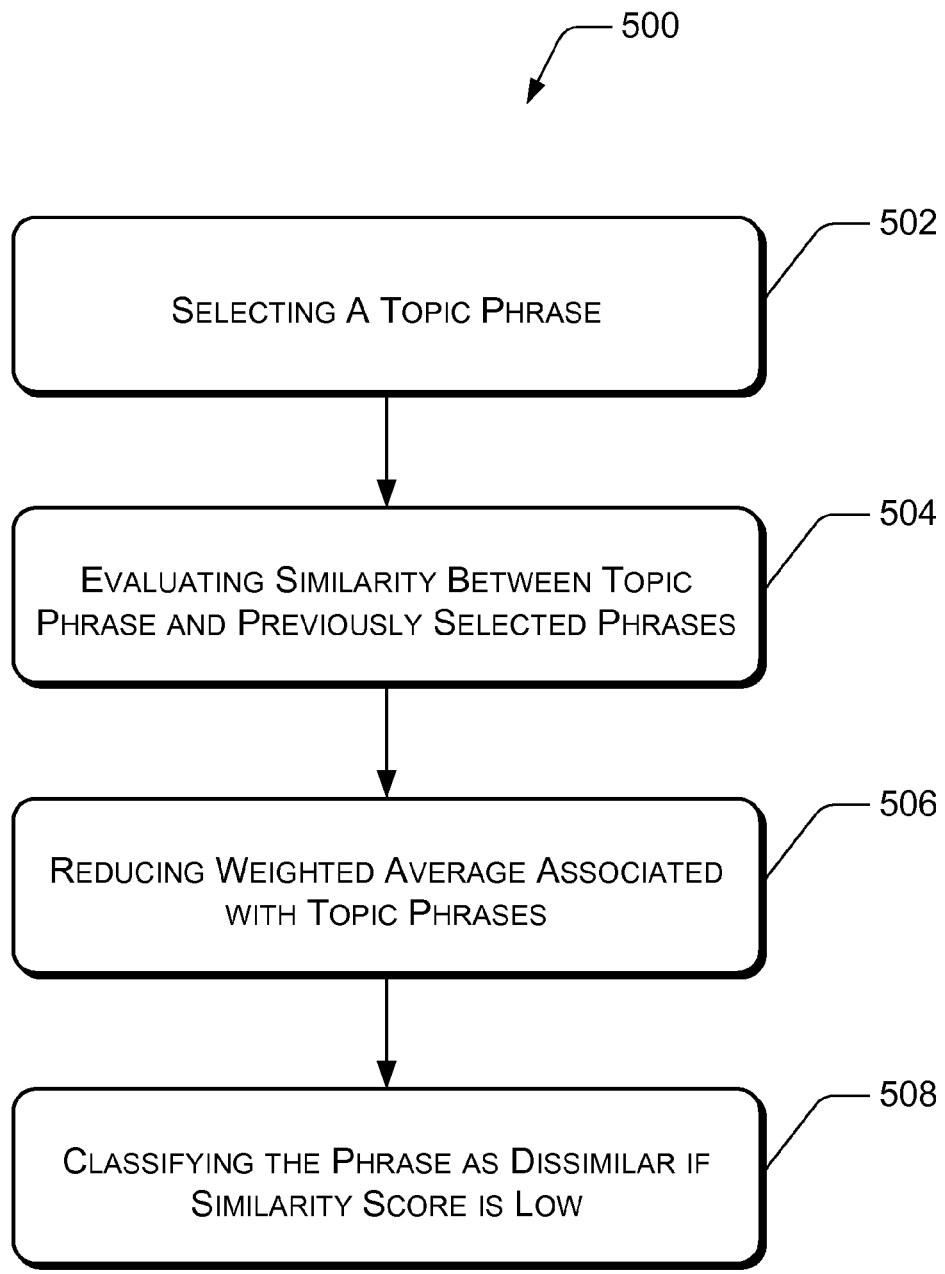
FIG. 5 illustrates exemplary method(s) for implementing phrase diversification.

FIG. 5 illustrates an exemplary method 500 being implemented by one or more program modules or agents residing on a computing device for phrase diversification for reducing redundancy between extracted phrases, for example, in any one or more of the client devices 104.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, a topic phrase is selected. For example, diversification module 110 can select a topic phrase from the weighted data 216.

At block 504, the similarity between the topic phrase and previously selected phrases is evaluated. For example, the diversification module 110 measures the dissimilarity by ascertaining similarity of the extracted phrases to topics that have been used as previously selected topic phrases. In one implementation, the diversification module 110 maximizes the dissimilarity between the extracted phrases by using a greedy algorithm. The manner in which the dissimilarity can be greedily maximized can be performed by techniques known in the art.

At block 506, the weight associated with the topic phrases (as a part of the re-weighting process), is reduced in the event that the topic phrase is similar to a previously selected phrase. For example, on determining similarity between the extracted phrases and the previously selected topics, the diversification module 110 reduces the weighted frequency that is associated with the extracted phrases. In one implementation, the diversification module 110 reduces the value of the LSA-weighted frequency (as evaluated previously), while document re-weighting. In this manner, the weight associated with the extracted phrases is reduced, if it is found that the phrases are similar to previously selected phrases, and hence reducing redundancy. In yet another implementation, the dissimilarity score is used for evaluating a modified LSA-weighted frequency. The diversification module 110 then ranks the phrases as per the evaluated LSA-weighted frequency for each of the latent topic that was associated with the phrases.

At block 508, the phrase is classified as dissimilar based on the evaluation of the above processes. For example, if the diversification module 110 evaluates that the topic phrase under consideration is far apart in terms of the meaning to which it correlates to, and then the topic phrase is classified as dissimilar. The relevancy, as indicated by their corresponding average weights, of the similar phrases is reduced on them being similar to the previously selected phrases.

Exemplary Algorithm

Figure 6:
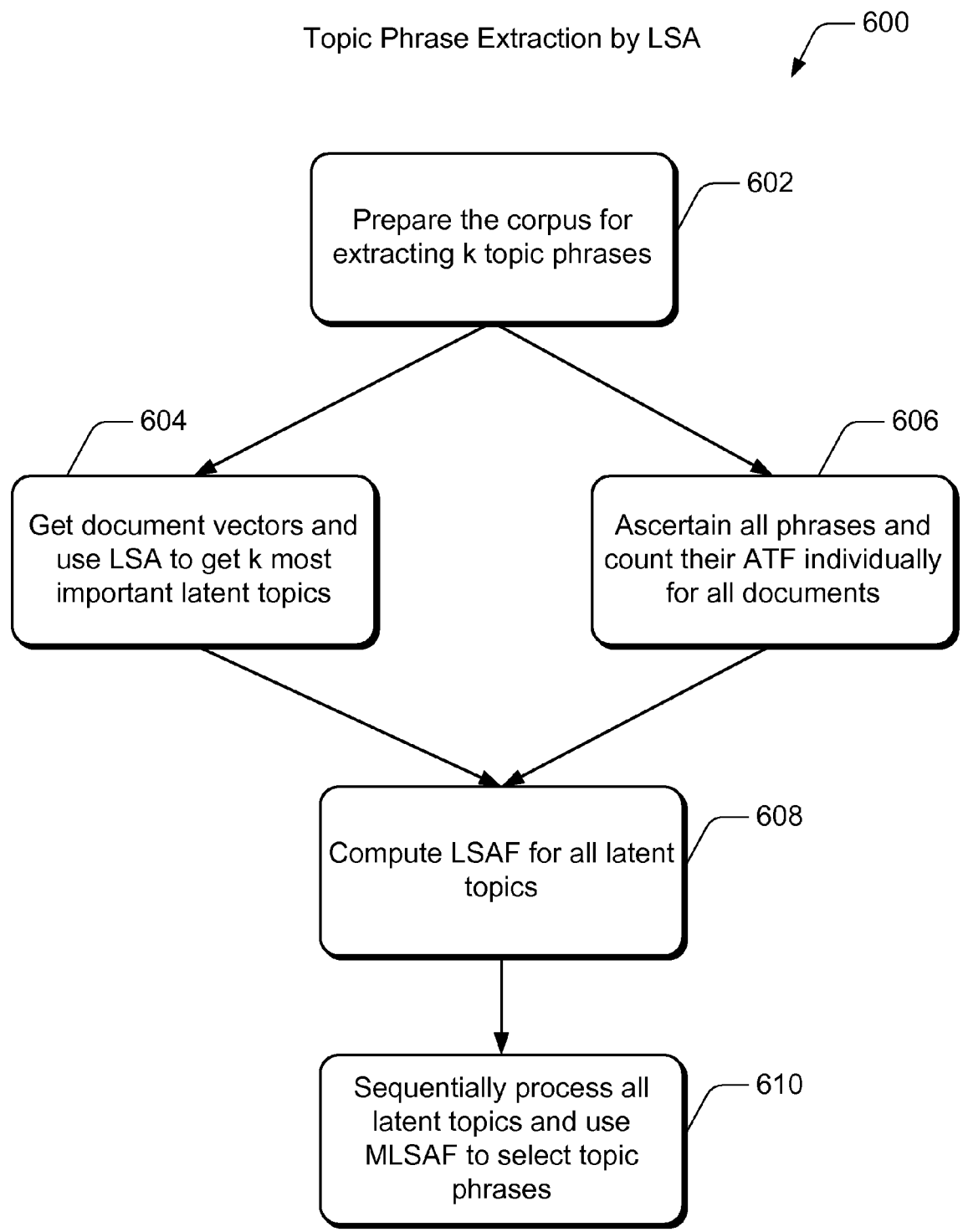
FIG. 6 illustrates a flowchart representing an exemplary topic phrase extraction mechanism by LSA.

FIG. 6 illustrates a flowchart representing an exemplary topic phrase extraction mechanism by LSA. The flowchart is directed to an algorithm to perform a method for keyword extraction.

At 602, the algorithm implements the preparation of a corpus of documents for extraction of topic phrases. In one implementation, the corpus of documents can be prepared by the phrase extraction and re-weighting module 108.

At block 604, word sequences with certain frequency of occurrence and correlation are selected using LSA. In one implementation, the phrase extraction and re-weighting module 108 selects word sequences with certain numbers of occurrence and mutual information as candidate phrases. The word sequences so selected are such that the ordering of the words result in phrases with meaningful concepts. In one implementation, mutual information for word sequences can be evaluated by known techniques, such as those discussed in the article titled Parsing a Natural Language Using Mutual Information Statistics, by D. M. Magerman, M. P. Marcus, published in AAAI 1990.

At block 606, latent topics associated with the corpus can be analyzed. In one implementation, block 604 can be implemented along with block 606. In another implementation the latent topics of the corpus can be analyzed by representing the corpus as a document-term matrix. The document term matrix is then used for abstracting first k latent topics with the largest singular values using Latent Semantic Analysis or LSA. As indicated previously in LSA, a document and term association can be represented by an LSA matrix which is again acquired by the multiplication of three matrices. The three matrices each relates to a document, one or more terms that are correlated with the document, and a concept that defines the correlation of the term with the documents.

At block 608, the algorithm as illustrated evaluates the LSA weighted frequency for all latent topics. The evaluation of the LSA weighted frequency aims to re-weigh the documents. The re-weighting of documents results in imparting a new relevance of the term to the document. In another imple mentation, the LSA-weighted frequency can be represented by Equation 4 as indicated above, which is as follows:

$$LSAF(w_1 w_2 \ldots w_n) = \sum_{j=1}^{d} \left( |\alpha_{i,j}| \cdot \sqrt{n} \left( \frac{1}{n} \sum_{m=1}^{n} N_{j,m} \right) \right)$$

where $N_{j,m}$ is the term frequency of $w_m$ in a document. The re-weighting accomplishes the strengthening of documents and increase the frequency of terms that appear in the specific document. In addition, a careful analysis of the LSA matrix A would indicate that each of the latent topics is far apart from the other latent topics. This assures that different subset of documents will be strengthened even though the extracted phrase may be occurring only in certain portions of the documents in consideration.

At block 610, all latent topics are sequentially processed. In one implementation, the processing of the latent topics includes evaluating a modified LSA-weighted frequency. The modified LSA-weighted frequency, in one implementation can be represented by Equation 6, which is as follows:

$$MLSAF(P) = LSAF(P) \cdot \min_{T \in \{Selected\ Phrases\}} DIS(P, T)$$

For the above expression, the dissimilarity score is the same as that represented by Equation 5. In the above expression, P is a phrase under consideration, {Selected Phrases} is the set of all selected topic phrases from the previously selected latent topics. In another implementation, diversification module 110 reduces the modified LSA-weighted frequency, thereby reducing the redundancy between the selected phrases. In yet another implementation, the modified LSA-weighted frequency is a function of the dissimilarity between the one or more of the extracted phrases. As mentioned previously, the dissimilarity between the extracted phrases is indicative of the fact that the phrases are far apart from each other in terms of the concepts that they relate to. For example, the dissimilarity score can be represented by Equation 5, which is as follows:

$$DIS(P, Q) = \underset{-q \leq \beta \leq p}{\operatorname{argmin}} \sum_{i=1-q}^{p+q} |a_i - b_{i-\beta}|$$

For the above equation, $a_i=0$ for $i<1$ or $i>p$, $b_i=0$ for $i<1$ or $i>q$. In this case, it can be gathered that $a_i$ and $b_j$ are vectors and $|a_i-b_j|$ is their L-1 norm. In this implementation, the value of dissimilarity can be evaluated as sum of distances between corresponding terms in the two sequences with a displacement of β terms. For the above expression, the dissimilarity score so evaluated would consider the ordering of words, i.e. the dissimilarity score so evaluated would also be lower for when one part of say phrase P is similar to another part of phrase Q. The dissimilarity score for the phrases can be stored in document data 214 for further retrieval and analysis.

CONCLUSION

Although embodiments for implementing diverse topic phrase extraction have been described in language specific to structural features and/or methods, it is to be understood that the subject of the appended claims is not necessarily limited to the specific features or methods described. Rather, the specific features and methods are disclosed as exemplary implementations for implementing diverse topic phrase extraction.

The invention claimed is:

1. A method, implemented by one or more computing devices, of summarizing search results from a corpus, the method comprising:
    re-weighting, by the one or more computing devices, documents based at least in part on a latent topic to identify topic phrases associated with candidate phrases occurring within one or more of the documents, the re-weighting comprising strengthening a subset of the documents that are indicated by the latent topic by adjusting document weights to increase a term frequency of one or more terms within the subset of the documents associated with the latent topic;
    evaluating, by the one or more computing devices, based in part on the increase of the term frequency of the one or more terms, a modified latent semantic analysis (LSA)-weighted frequency of one or more documents of the subset of the documents to identify the topic phrases; and
    filtering, by the one or more computing devices, the documents having similar topic phrases to remove redundancy of the similar topic phrases.

2. The method of claim 1, wherein the re-weighting further comprises:
    selecting one or more additional latent topics from the corpus, each latent topic being characterized by a singular value, wherein each singular value indicates a relevance of topic phrases associated with the documents;
    arranging the one or more additional latent topics based on the singular values;
    extracting at least one topic phrase from the one or more additional latent topics.

3. The method of claim 1, wherein concepts associated with the documents are based at least on an association between the documents and constituent phrases of the documents.

4. The method of claim 3, wherein the association between the documents and the constituent phrases is implemented using latent semantic analysis.

5. The method of claim 2, further comprising associating a weighted frequency value based on the singular value of an associated latent topic.

6. The method of claim 1, wherein the filtering comprises:
    evaluating a dissimilarity score between a pair of the topic phrases in the documents, wherein the filtering is based at least on a basis of the dissimilarity score.

7. The method of claim 6, wherein the dissimilarity score indicates an extent of dissimilarity between the dissimilar topic phrases.

8. A system comprising:
    one or more processors;
    a memory;
    a re-weighting module configured to perform acts, the acts comprising:
        identifying topic phrases associated with documents;
        determining a latent topic by associating the documents with weight factors based on an association of terms within constituent phrases that appear in the documents, at least one concept being characterized by the latent topic; and
        re-weighting the documents, the re-weighting comprising strengthening a subset of the documents that are indicated by the latent topic by adjusting document weights to increase a term frequency of one or more terms within the subset of the documents associated with the latent topic;

a diversification module configured to perform acts comprising:

evaluating, based in part on the increase of the term frequency of the one or more terms, a modified latent semantic analysis (LSA)-weighted frequency of one or more documents of the subset of the documents;

removing documents associated with one or more similar concepts to result in a list of documents with unlike concepts.

9. The system of claim 8, wherein the re-weighting module performs acts further comprising:

arranging the latent topic among other determined latent topics based on a singular value of the latent topic; and extracting at least one topic phrase from the latent topic based in part on the evaluating the modified LSA-weighted frequency.

10. The system of claim 8, wherein the at least one concept is based at least on an association between at least one of the constituent phrases and one or more of the documents.

11. The system of claim 10, wherein the association between at least one of the constituent phrases and one or more of the documents is implemented using latent semantic analysis.

12. The system of claim 8, wherein the diversification module:

calculates a dissimilarity score between at least a pair of the topic phrases in the documents; and retains one or more topic phrases based on the dissimilarity score.

13. One or more computer-readable storage devices comprising computer executable instructions that, when executed, direct a computing system to perform acts, the acts comprising:

re-weighting documents in a corpus based at least in part on a latent topic to identify one or more concepts associated with the documents, the re-weighting comprising strengthening a subset of the documents that are indicated by the latent topic by adjusting document weights to increase a term frequency of each of one or more terms within the subset of the documents associated with the latent topic;

evaluating, based in part on the increase of the term frequency of each of the one or more terms, a modified latent semantic analysis (LSA)-weighted frequency of one or more documents of the subset of the documents to identify one or more topic phrases associated with the latent topic; and filtering the documents associated with similar concepts to result in a document collection with unlike concepts.

14. The one or more computer-readable storage devices of claim 13, wherein the re-weighting further comprises:

selecting one or more additional latent topics from the corpus, each latent topic being characterized by a singular value, wherein each singular value indicates a relevance of concepts associated with the documents;

arranging the latent topics based on the singular values; and extracting at least one phrase from one or more of the latent topics.

15. The one or more computer-readable storage devices of claim 14, wherein the concepts associated with the documents are based at least on an association implemented using latent semantic analysis.

16. The one or more computer-readable storage devices of claim 13, wherein the filtering comprises:

evaluating a dissimilarity score between at least a pair of phrases in the documents;

sifting phrases based at least on a basis of the dissimilarity score.

17. The one or more computer-readable storage devices of claim 16, wherein the dissimilarity score indicates an extent of dissimilarity between dissimilar phrases.

18. The one or more computer-readable storage devices of claim 16, wherein the dissimilarity score is dependent on order of appearance of words in the phrases.

* * * * *